(12) United States Patent
Cernasov et al.

(10) Patent No.: US 7,791,813 B2
(45) Date of Patent: Sep. 7, 2010

(54) MICROFLUIDIC IMAGING ARRAY

(75) Inventors: Andrei Cernasov, Ringwood, NJ (US); Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 973 days.

(21) Appl. No.: 11/546,442

(22) Filed: Oct. 12, 2006

(65) Prior Publication Data

US 2008/0093220 A1 Apr. 24, 2008

(51) Int. Cl.
*G02B 1/06* (2006.01)
(52) U.S. Cl. .................... 359/665; 359/497; 349/193
(58) Field of Classification Search .............. 359/665, 359/497, 495; 349/193, 15, 200
See application file for complete search history.

(56) References Cited

U.S. PATENT DOCUMENTS

| | | | |
|---|---|---|---|
| 6,037,955 A | 3/2000 | DeBoer et al. | |
| 6,473,492 B2 | 10/2002 | Prins et al. | |
| 6,603,444 B1 * | 8/2003 | Kawanami et al. | 345/32 |
| 6,847,493 B1 | 1/2005 | Davis et al. | |
| 6,961,167 B2 | 11/2005 | Prins et al. | |
| 7,474,470 B2 * | 1/2009 | Cernasov | 359/665 |
| 2003/0202235 A1 | 10/2003 | Rabinowitz et al. | |
| 2004/0160684 A1 | 8/2004 | Prins et al. | |
| 2008/0055711 A1 | 3/2008 | Kolodner et al. | |

OTHER PUBLICATIONS

T. Okayama et al., Effects of Dissolved Water in Insulator Silicon Oil on Electrical Conduction, Jul. 8-12, 1991, Proceedlings of third international conferenceon Properties and application of Dielectric materials. Table 10.*
Joseph Cook et al., Electrical Conductivity of Electrolyte, Dec. 16, 2009, Western Washington University, p. 2 second paragraph.*
Feenstra, Johan et al., Jan. 2006, "Electrowetting Displays" Liquavista BV, pp. 1-16.
Douglass, Michael R. et al., Oct. 30, 1997, "Why is the Texas Instruments Digital Micromirror Device™ (DMD™) so reliable?", 135_Myth.pdf; CVPINFO\DOUGLASS\PAPER\myths8.doc.
Fry, M.A., Office Action issued on Oct. 8, 2009, for U.S. Appl. No. 11/546,441.
Naeckel, A.T., Response Pursuant to 37 C.F.R. 1.111, dated Jan. 8, 2010, for U.S. Appl. No. 11/546,441.
Fry, M.A., Office Action issued on Apr. 15, 2010, for U.S. Appl. No. 11/546,441.

* cited by examiner

*Primary Examiner*—Timothy J Thompson
(74) *Attorney, Agent, or Firm*—Ingrassia Fisher & Lorenz, P.C.

(57) ABSTRACT

A projection-type imaging array comprising a plurality of microfluidic devices (1, 1') are provided, each microfluidic device having a reservoir (30) containing first and second fluids (10 and 20) that are immiscible with respect to teach other. A drive unit (40) is provided for each microfluidic device to selectively displace the surface formed at the interface between the first and second fluids. Accordingly, when a particular microfluidic device is turned OFF according to the drive unit, the interface surface is positioned to redirect incoming light (via reflection/refraction) away from a display surface (80). Conversely, when the microfluidic device is turned ON, the interface surface is positioned so that the incoming light is directed toward the display surface.

19 Claims, 9 Drawing Sheets

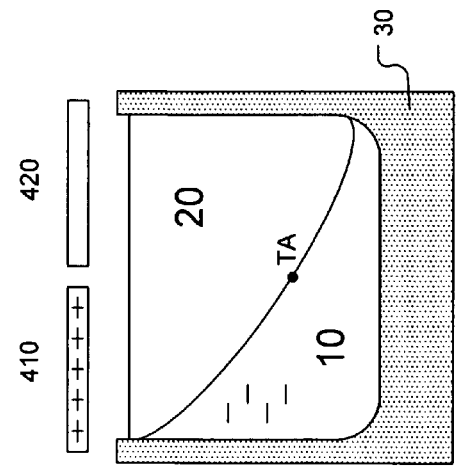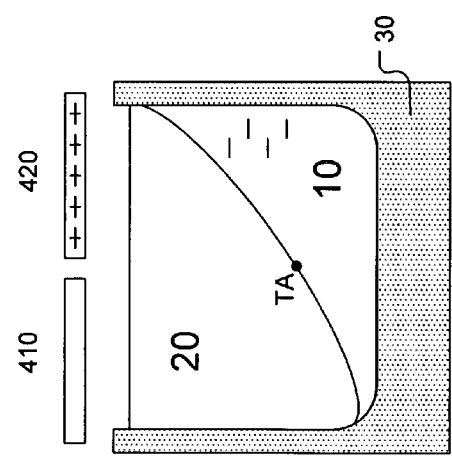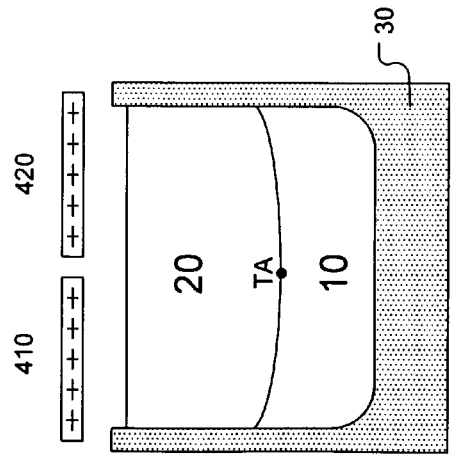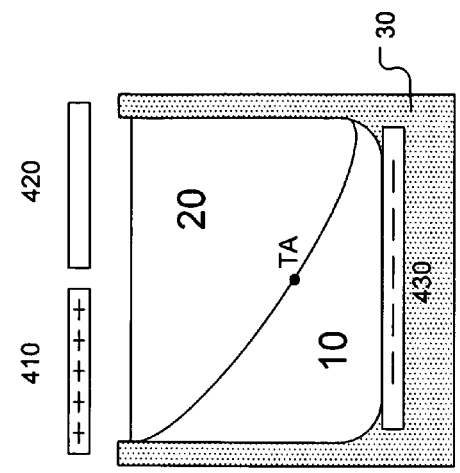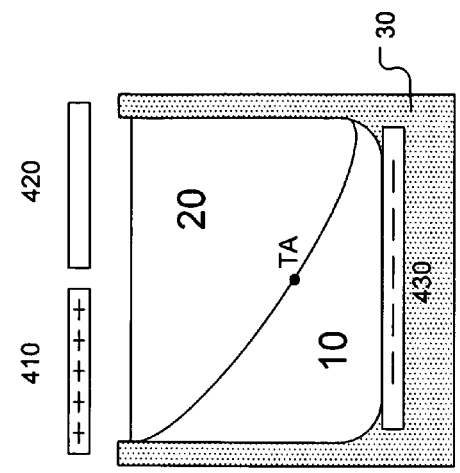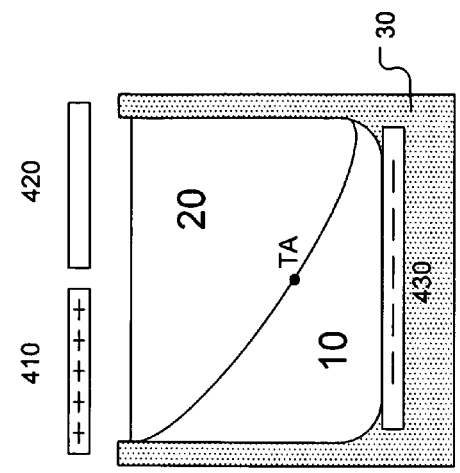

MICROFLUIDIC IMAGING ARRAY

FIELD OF THE INVENTION

The present invention relates to image display devices, and more particularly, to projection display devices utilizing an array of microfluidic devices.

BACKGROUND OF THE INVENTION

Among technologies in use today for projection display is the micro-mechanical device approach. An example of this is the Digital Micromirror Device™ (DMD) from Texas Instruments, which comprises an array of microscopically sized mirrors. Each mirror, which corresponds to a single pixel in the displayed image, can take one of two tilt positions: ON and OFF. In the ON position, the micro-mirror reflects incoming light through a projection lens to the screen. In the OFF position, the micro-mirror directs light away from the lens, toward a light absorber.

To display a monochrome image, the DMD controller keeps each micro-mirror in the ON position for a period of time in the frame cycle that is proportional to the desired pixel brightness. To add color, a spinning color wheel is used in connection with the DMD array projector.

For example, during each frame, white light is focused down onto a spinning color wheel filter system, causing the DMD array to be illuminated sequentially with red, green, and blue light. At the same time, an RGB video signal for each pixel is sent to the corresponding micro-mirror. As they are illuminated with each color, the mirrors are turned ON depending on how much of that color is needed. The viewer's eyes integrate these sequential images such that a full image is seen.

The DMD technology has several disadvantages. For example, it is an expensive technology and difficult to scale up and down. A DMD system cannot be upgraded to a larger size and/or higher resolution without a very large investment.

SUMMARY OF THE INVENTION

Exemplary embodiments of the present invention provide a projection-type imaging array comprising a plurality of microfluidic devices, rather than the micro-mechanical mirrors utilized in existing systems. Each microfluidic device includes a reservoir containing first and second fluids that are immiscible (incapable of mixing) with respect to teach other. As such, a surface is formed at the interface between the first and second fluids. This interface surface operates as a reflector or refractor of light transmitted to the imaging array. Accordingly, each microfluidic device is operative to reflect/deflect incoming light in the same manner as the micromechanical mirror devices utilized in existing projection display devices.

Further, the two fluids have different electrical or magnetic properties, such that the interface surface may be put into different positions (ON and OFF) through an electric or magnetic force. For instance, in the ON position, the interface surface of a microfluidic device reflects/deflects the incoming light toward a display surface. Conversely, while in the OFF position, the interface surface reflects/deflects the light away from the display surface.

The first and second fluids may have different refraction indices to ensure the reflective/deflective properties of the microfluidic device. Specifically, the configuration of each microfluidic device and the refraction indices should ensure that the incoming light is redirected from the interface surface to the proper location based on the ON/OFF position of the device. However, in an alternative embodiment, one of fluids may be reflective while the other is optically clear, thereby causing the microfluidic device to properly direct the incoming light based on the ON/OFF state.

Further aspects in the scope of applicability of the present invention will become apparent from the detailed description provided below. However, it should be understood that the detailed description and specific embodiments provided therein, while disclosing exemplary embodiments of the invention, are provided specifically for illustration only.

BRIEF DESCRIPTION OF THE DRAWINGS

A more complete understanding of the present invention will become apparent from the following description taken in conjunction with the accompanying drawings, wherein:

FIGS. 2A-2C illustrate the use of electrokinetic force to control the positioning of the interface surface according to an exemplary embodiment of the present invention;

FIGS. 3A-3C illustrate an exemplary embodiment of the present invention where the microfluidic device employs dielectrophoresis;

DETAILED DESCRIPTION OF EXEMPLARY EMBODIMENTS

In the present invention, the micro-mechanical device approach to projection display is replaced with the use of microfluidic devices. Specifically, each microfluidic device includes a reservoir containing two fluids that are immiscible (incapable of mixing together). The interface between these two fluids is capable of reflecting or refracting the projection light toward or away from a display surface (screen) depending on the ON/OFF state of the device. Since the fluids have different electric properties, the ON and OFF position of the interface surface may be controlled by an electrical action.

Each microfluidic device may correspond to a particular pixel element of the image. Accordingly, in a projection-type display system utilizing principles of the present invention, an array of microfluidic devices may be implemented for the plurality of pixel elements within the displayed image. The system for electronically driving this microfluidic imaging array may be compatible with the thin-film transistor (TFT) that had previously been used for the manufacture of liquid crystal display (LCD) panels.

Exemplary embodiments of the present invention will be described below in connection with the accompanying figures. These figures are provided for purposes of illustration only and are not drawn to scale. Also, in the figures, like elements are denoted by like reference numbers.

Figure 1B:
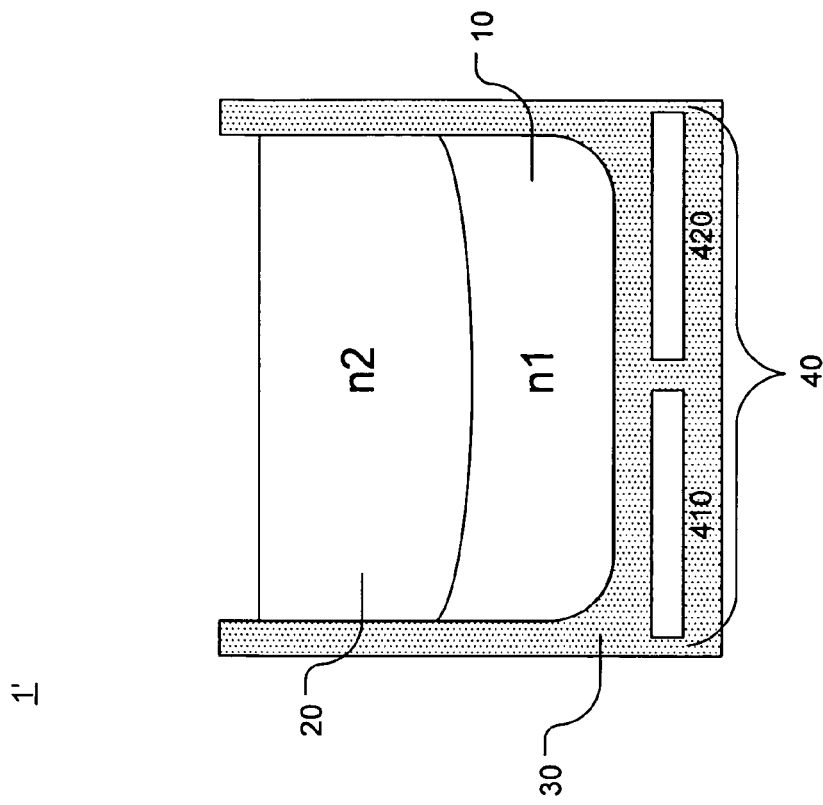
FIGS. 1A and 1B illustrate alternative configurations for a microfluidic device, according to exemplary embodiments of the present invention.
Figure 1A:
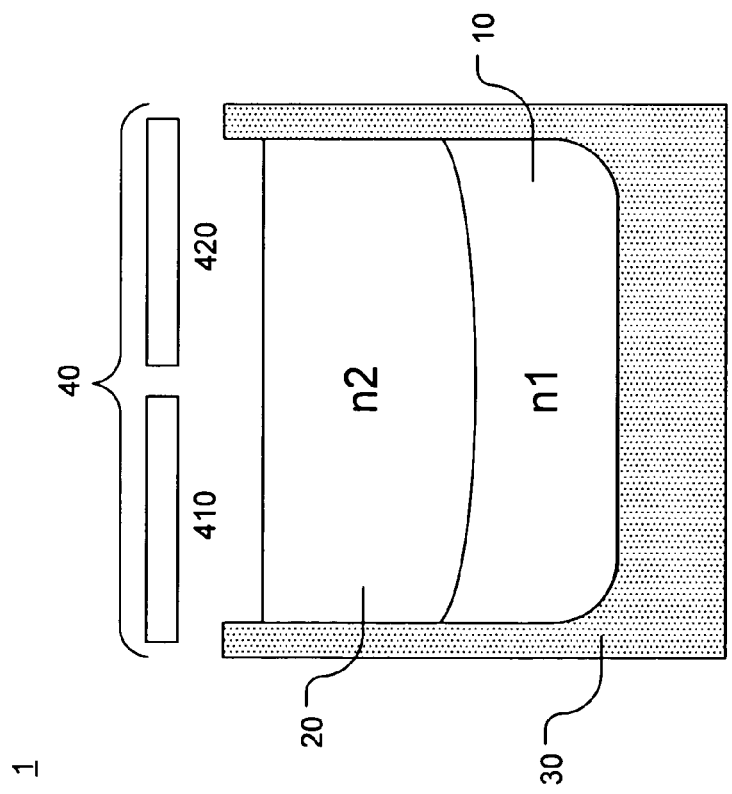

FIGS. 1A and 1B each illustrates a configuration of the microfluidic device according to an exemplary embodiment. Specifically, FIG. 1 illustrates an embodiment in which the microfluidic device 1 includes a drive unit 40 disposed above the reservoir 30 containing the first and second fluids 10 and 20, respectively. FIG. 1B, on the other hand, illustrates an alternative embodiment in which the microfluidic device 1' incorporates the drive unit 40 below the reservoir 30 containing the first and second fluids 10 and 20, respectively (e.g., drive unit 40 is incorporated in the material of the bottom part of the reservoir).

In the microfluidic device 1, 1' illustrated in FIGS. 1A and 1B, the first fluid 10 and second fluid 20 are immiscible and, thus, do not mix with each other. Accordingly, as shown in these figures, a distinct surface is formed within the reservoir 30 at the interface of the first and second fluids 10 and 20. Furthermore, the first and second fluids 10 and 20 may be electrically or magnetically different. This allows the steering electrodes 410 and 420 of the drive unit 40 to displace the interface surface between the first and second fluids 10 and 20 through the selective application of voltage to each electrode 410, 420.

In an exemplary embodiment, one of the fluids 10 and 20 has a higher level of electrical conductivity than the other. Thus, when a voltage is applied to only one of the steering electrodes 410 and 420, the resultant non-uniform electric field applied by the driving unit 40 causes the fluid of higher electrical conductivity to be displaced toward one of the electrodes 410 and 420. This movement is caused by electrophoresis. The movement of the higher-conductivity fluid 10 or 20 causes the interface surface to change position, as will be described in more detail below in connection with FIGS. 2A-2C.

In the microfluidic device 1, 1' of FIGS. 1A and 1B, the electrically conductive fluid 10 is connected to another electrode, which is not shown in the figures. The reason for such an electrode is to ensure that the electrically conductive fluid 10 is either grounded or set to a particular potential.

However, in an alternative example embodiment, another type of electrokinetic force may be applied to cause the interface surface to changes position. For example, a dielectrophoretic force may be applied to cause the interface surface to change positions. In this embodiment, the first and second fluids 10 and 20 have different dielectric coefficients (i.e., electric permittivities). Thus, the application of a non-uniform electric field across the interface surface through the operation of steering electrodes 410 and 410 causes the fluid 10 and 20 of higher permittivity to move toward a selected one of the electrodes. This embodiment is illustrated in FIGS. 3A-3C.

For purposes of description only, it will be assumed that the electrokinetic force switching the microfluidic device 1, 1' between its ON and OFF state is electrophoresis. As such, it will be assumed that one of the first and second fluid 10 and 20 has a higher level of electrical conductivity than the other. This fluid will sometimes be referred hereinafter as the "electrically conductive fluid," even though the other fluid may also be electrically conductive (at a lower magnitude). However, it would readily apparent to those of ordinary skill in the art that the principles described below are also applicable to alternative embodiments utilizing dielectrophoresis and fluids of different dielectric coefficients.

In an exemplary embodiment, the electrically conductive fluid may be chosen from water, aromatic fluids like benzene, or some electrically conducting aqueous solution. The other fluid (sometimes referred to herein after as "insulating fluid") could be, for example, silicon oil or vegetable oil. However, the choice of fluids 10 and 20 are not necessarily limited to liquids. For instance, assuming that the second fluid 20 is designed as the insulating fluid, it may comprise a gas (although precautions may need to be taken to prevent the electrically conductive fluid 10 from evaporating).

Referring to FIGS. 1A and 1B, the drive unit 40 may be installed above or below the reservoir 30 according to alternative embodiments. In FIG. 1A, the microfluidic device 1 is configured with the drive unit 40 above the reservoir. For example, the drive unit 40 may be part of the structure that seals the first and second fluids 10 and 20 into the reservoir 30. Alternatively, FIG. 1B illustrates an embodiment of the microfluidic device 1' in which the drive unit 40 is installed below the first and second fluids 10 and 20. In the particular case shown in FIG. 1B, the steering electrodes 410 and 420 may be incorporated into the bottom wall of the reservoir 30.

FIGS. 2A-2C illustrate the operation of the steering electrodes 410 and 420 in selectively displacing the interface surface into different operative positions, according to the embodiment of the microfluidic device 1 illustrated in FIG. 1A.

The embodiment illustrated in FIGS. 2A-2C show examples of using electrophoresis, specifically electrowetting, to cause the interface surface to shift between different positions. In this embodiment, the first fluid 10 is assumed to be the electrically conductive fluid, while the second fluid 20 is the insulating fluid. However, such embodiments are not to be limiting. As discussed above, another type of electrokinetic force (e.g., dielectrophoresis) may be used. Also, the choice of electrically conductive and insulating fluids may be reversed.

According to an exemplary embodiment, the ON/OFF state of the microfluidic device 1, 1' may correspond to different tilt angles of the interface circuits. With the use of two steering electrodes 410 and 420, it is possible to displace interface surface into a multitude of different states or tilt angles.

Referring to FIGS. 2A-2C, the selected application of positive voltage to one or both of the steering electrodes 410 and 420 causes the interface surface to take on a particular tilt angle with respect to the tilt axis TA. In FIG. 2A, the application of a positive voltage to both steering electrodes 410 and 420 causes a uniform electric field above the fluids 10 and 20, such that the interface surface has relatively little or no tilt with respect to the tilt axis TA. However, in FIG. 2B, the application of a positive voltage only to steering electrode 420 attracts the electrically conductive fluid 10 to that electrode, thereby causing the interface surface to tilt toward steering electrode 420. In FIG. 2C, the application of the positive voltage only to steering electrode 410 has the reverse effect, thereby attracting the electrically conductive fluid 10 so that the interface surface tilts toward steering electrode 410.

In FIGS. 2B and 2C, the amount of tilt is a function of the amount of voltage applied to the respective steering electrode 410, 420 and other design parameters such as the choice of fluids 10 and 20.

Figure 10C:
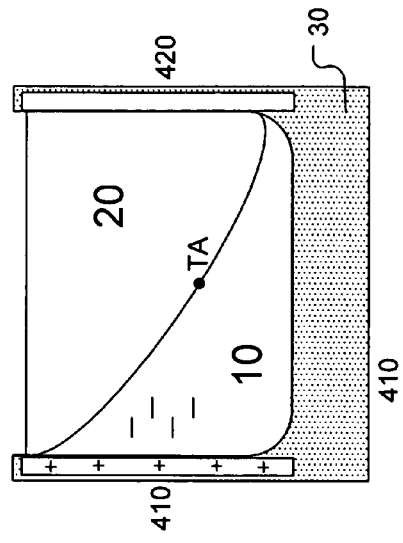
FIGS. 10A-10C illustrate an exemplary embodiment of the present invention where the microfluidic device employs electrowetting.
Figure 10B:
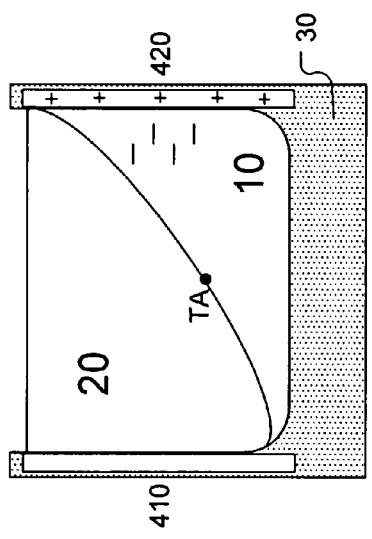
Figure 10A:
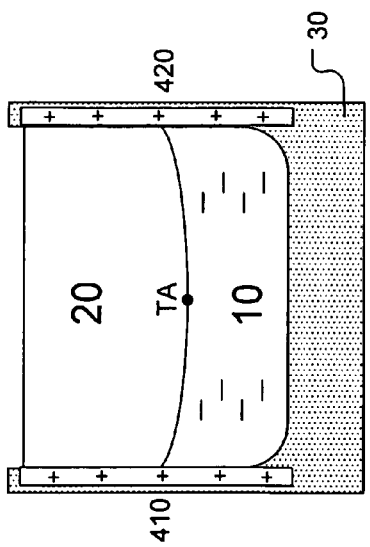

Although FIGS. 2A-2C illustrate a particular embodiment of the invention, it should be noted that these figures are merely illustrative, and other configurations are possible. For instance, the drive unit 40 may comprise steering electrodes disposed at opposing sides of the reservoir 30. For instance, if such steering electrodes are implemented within the side walls of the reservoir 30, electrowetting may be applied to cause the electrically conductive fluid 10 to "crawl" toward one steering electrode, thus moving the interface surface to the proper position. An example of an electrowetting embodiment of the invention is illustrated in FIGS. 10A-10C.

Furthermore, although operation of the microfluidic device 1 of FIGS. 2A-2C has been described above through the application of electrokinetic forces, it will be readily apparent that the same configuration could be used to displace the interface surface according to magnetic force. Particularly, it will be readily apparent to those of ordinary skill in the art to utilize fluids 10 and 20 with different magnetic properties, in such a manner that operation of drive unit 40 causes one of the fluids to be magnetically attracted/repulsed to a corresponding steering magnetic field (e.g., by coils, magnet, etc.) to appropriately move the interface surface.

As shown in the description above, the position of the interface surface may be selectively switched in accordance with an electronic drive unit 40. Furthermore, it will be shown that this interface surface can be used to selectively redirect incoming light at different angles in relation to the tilt position controlled by the electronic drive unit 40. As such, each microfluidic device 1, 1' may be configured as a pixel element in a projection display system.

Figure 4A:
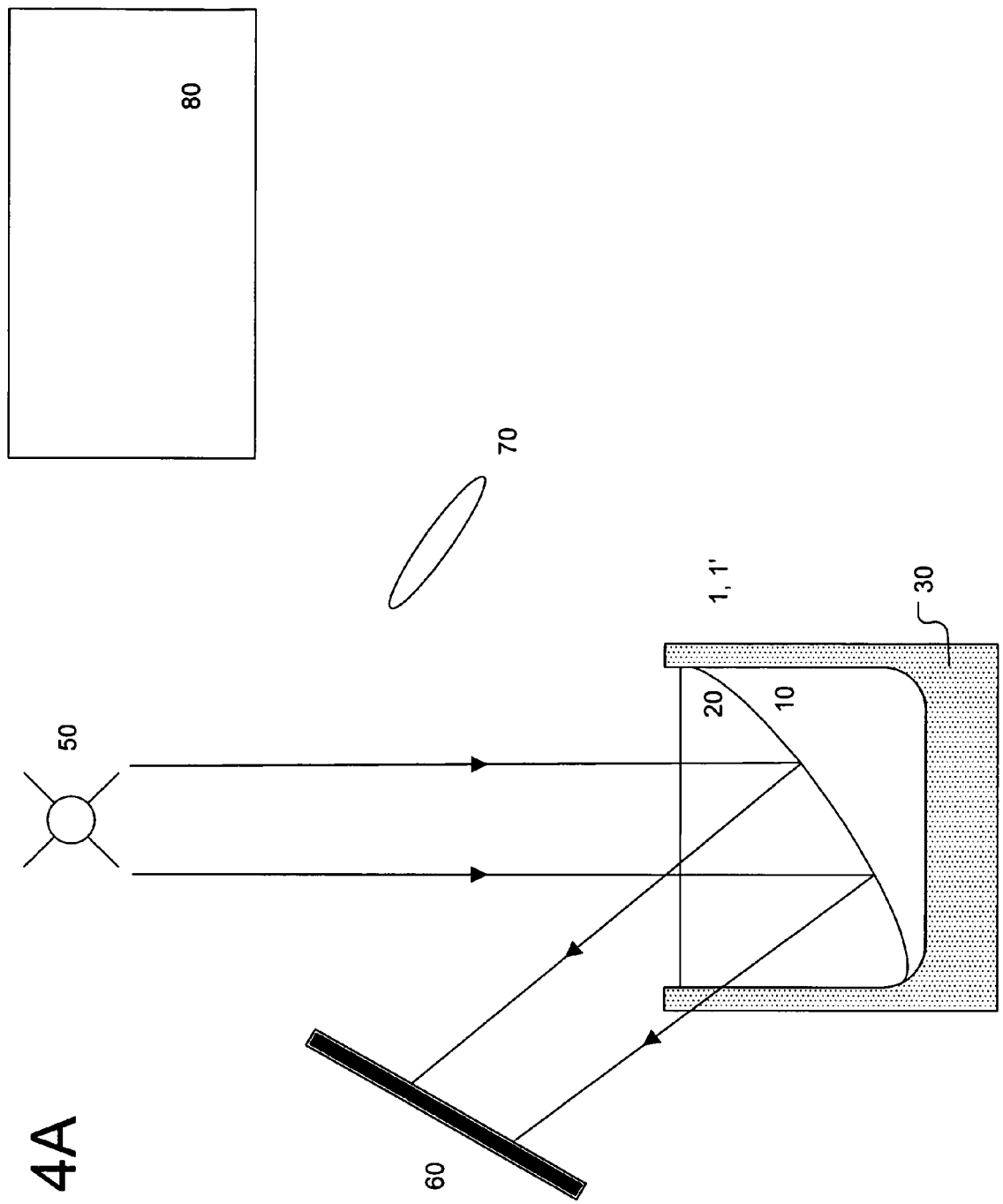
FIGS. 4A and 4B illustrate the operation of the microfluidic device as a reflector in a projection-type display system, according to an exemplary embodiment of the present invention.
Figure 4B:
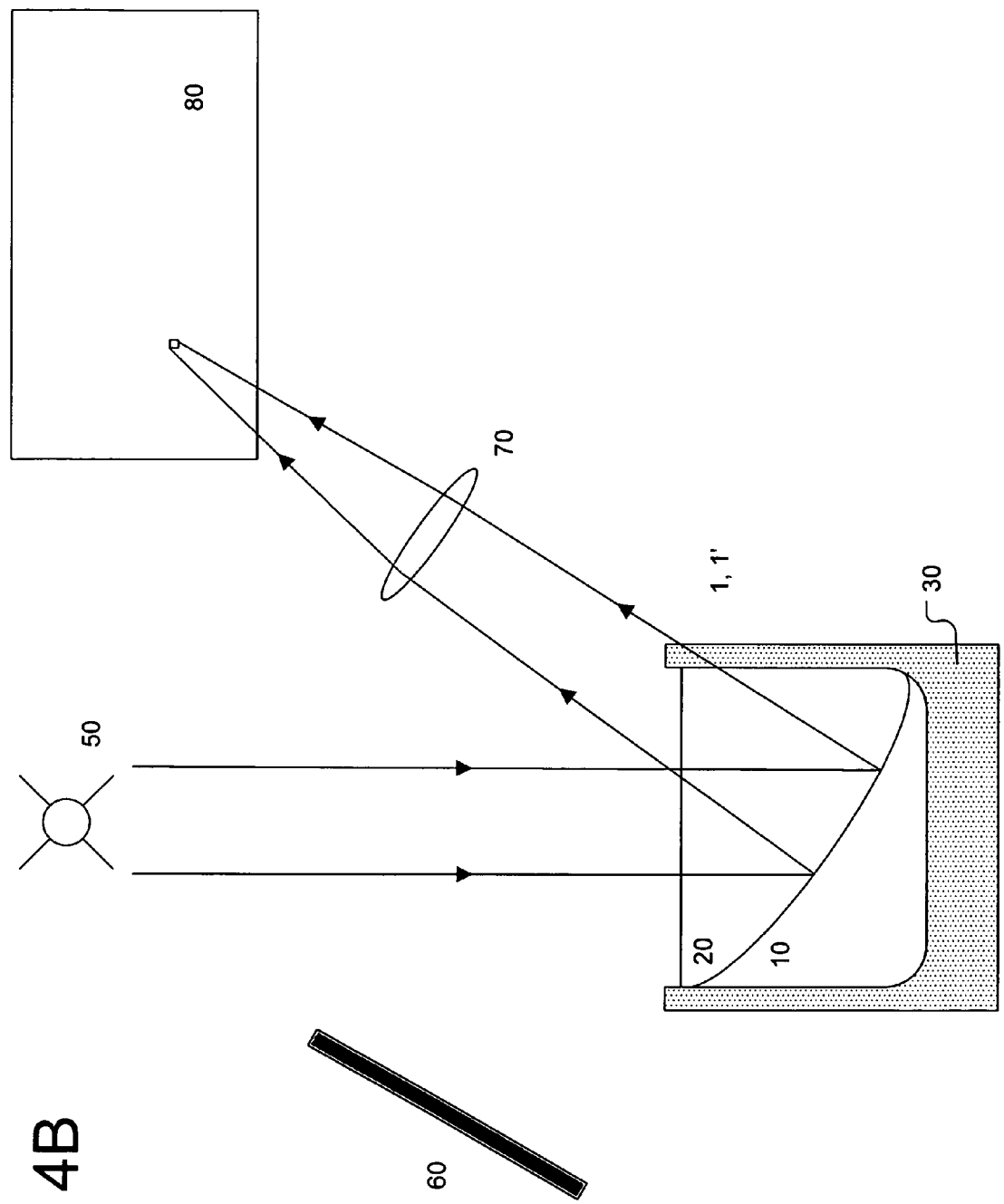

FIGS. 4A and 4B conceptually illustrate the use of a microfluidic device 1, 1' as a reflective-type pixel element in a projection image display system, according to an exemplary embodiment. These figures illustrate a light source 50 emitting toward the interface surface of the microfluidic device 1, 1'. These figures also illustrate an absorptive surface 60 (e.g., black surface) suitable for absorbing light. Furthermore, the system illustrated in FIGS. 4A and 4B include an optical system 70 and the display surface 80 (e.g., projection screen).

FIG. 4A illustrates a particular situation where the microfluidic device 1, 1' is set in the OFF state. Accordingly, the interface surface between fluids 10 and 20 is set to the OFF position, thereby reflecting the incoming light from light source 50 toward the absorptive surface 60. On the other hand, FIG. 4B illustrates the situation where the microfluidic device 1, 1' is in the ON state. Accordingly, the interface surface is set in the ON position, thereby reflecting light toward the display surface 80 via the optical system 70. For example, the optical system 70 may include a projection lens configured to focus light toward the particular pixel corresponding to the microfluidic device 1, 1'. However, the optical system 70 may include any arrangement of optical elements suitable for focusing light from the interface surface (in ON position) towards the corresponding pixel, as will be contemplated by those of ordinary skill in the art.

As illustrated in FIGS. 4A and 4B, the projection display system may include a microfluidic device 1 corresponding to the embodiment illustrated in FIG. 1A. Accordingly, the drive unit 40 may be disposed above the microfluidic device 1. To facilitate this, in an exemplary embodiment, the steering electrodes 410 and 420 of the drive unit 40 are made optically transparent in order to allow the incoming light to pass through. Also, the reservoir 30 may be constructed of an optically transparent material to help ensure that the incoming light is reflected unobstructedly towards the absorbed surface 60 and display surface 80 as appropriate.

If the system illustrated in FIGS. 4A and 4B utilize a microfluidic device 1' corresponding to the embodiment of FIG. 1B, the reservoir 30 may similarly be constructed of an optically transparent material to facilitate the unobstructed reflection of light.

Figure 5A:
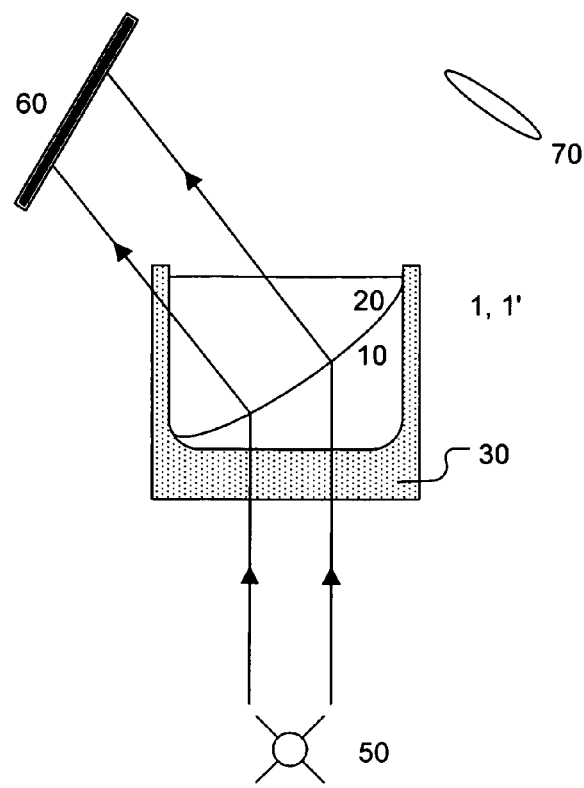
FIGS. 5A and 5B illustrate the operation of a microfluidic device as a refractor in a projection-type display system, according to an exemplary embodiment of the present invention.
Figure 5B:
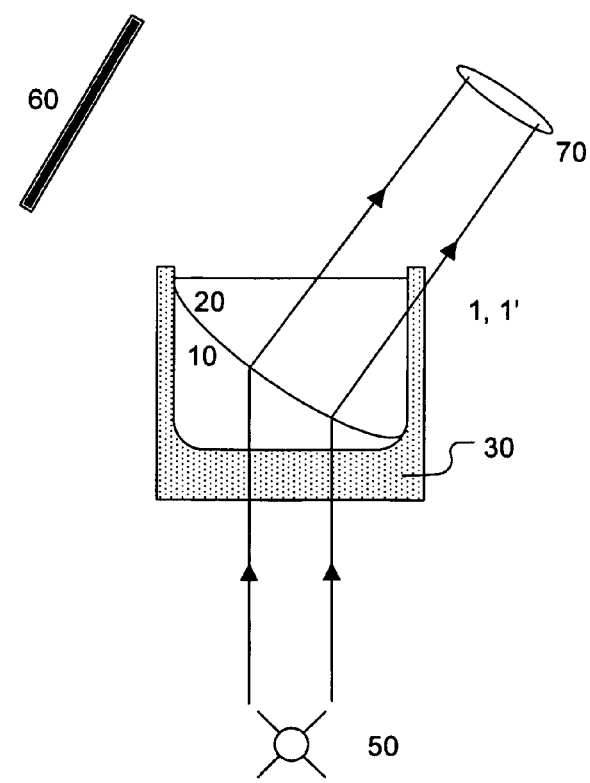

FIGS. 5A and 5B conceptually illustrate an image projection system according to an alternative exemplary embodiment in which the input light is transmitted through the reservoir 30 and refracted by the interface surface of the microfluidic device 1, 1' toward the absorptive surface 60 or display surface 80 (not shown) via the optical system 70. Of course, as illustrated in this embodiment, the reservoir 30 is optically transparent in order to allow the light from source 50 to transmit through to the interface surface. Furthermore, the steering electrodes 410 and 420 (not shown) may also be optically transparent to facilitate the unobstructed transmission of light.

To ensure that the interface surface directs the incoming light to the proper location based on its ON/OFF state, the fluids 10 and 20 may be designed with different optical characteristics. For example, in the case shown in FIGS. 4A and 4B, fluid 10 may be reflective while fluid 20 is optically clear. In the alternative case of FIGS. 5A and 5B, the fluids 10 and 20 may have different refraction coefficients to ensure proper refraction of the light. It will be readily apparent to those of ordinary skill in the art what optical characteristics are required of the fluids 10 and 20 to ensure proper operation of the microfluidic device 1, 1'.

FIGS. 2A-2C show a particular example where two steering electrodes 410 and 420 selectively displaces the interface surface of microfluidic device 1 into one of three operative positions, or tilt angles, with respect to a particular tilt axis TA (however, the number of possible tilt angles in this embodiment is not limited to three). Further, according to an alternative exemplary embodiment, the drive unit 40 may include more than two steering electrodes in order to add to the operative positions into which the interface surface can be selectively displaced.

Figure 6:
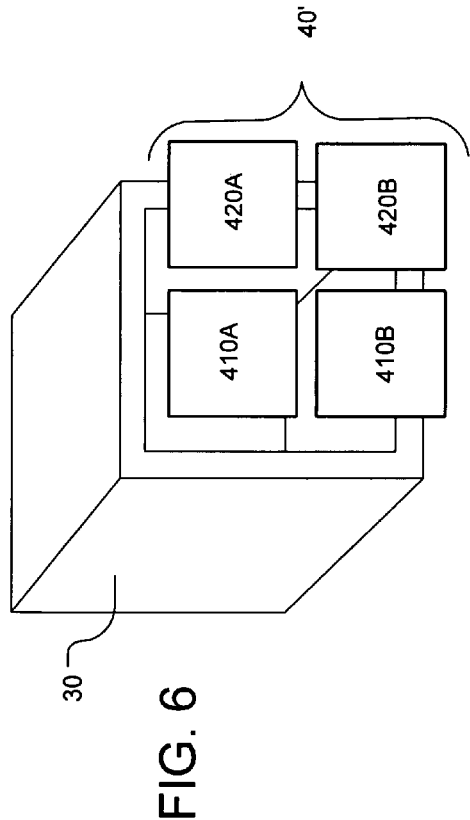
FIG. 6 illustrates a driving unit configured for two-dimensional tilting of the interface surface in a microfluidic device, according to an exemplary embodiment of the present invention.

According to an exemplary embodiment, four steering electrodes may be implemented in the driving unit of a microfluidic device. FIG. 6 illustrates a driving unit 40' containing four steering electrodes 410A, 410B, 420A, and 420B. For purposes of illustration, the driving unit 40' of FIG. 6 is illustrated as being implemented above the reservoir 30 of the microfluidic device, similar to the configuration of the microfluidic device 1 illustrated in FIG. 1A. However, it will be readily apparent to those of ordinary skill in the art that the driving unit 40' could also be implemented below the first and second fluids 10 and 20 in reservoir 30, i.e., in a configuration similar to the embodiment illustrated in FIG. 1B.

In particular, the use of four steering electrodes 410A, 410B, 420A, and 420B allows for two-dimensional tilting of the interface surface. Such two-dimensional tilting is illustrated in FIGS. 7A-7E. The operative principles of two-dimensional tilting will be described below in relation to FIGS. 7A-7E. For purpose of illustration, these figures and the accompanying description assume a configuration with the steering electrodes 410A, 410B, 420A, and 420B above the reservoir 30, as shown in FIG. 6. However, it will be readily apparent to those of ordinary skill in the art how the operative principles would apply to an embodiment with the driving unit 40' implemented below the fluids 10 and 20.

It should be noted that FIGS. 7A-7E each illustrates a view facing (and looking through) the bottom wall of the reservoir 30. Below each figure is a diagram illustrating the voltages selectively applied to the steering electrodes 410A, 410B, 420A, and 420B. However, the position of the actual steering electrodes 410A, 410B, 420A, and 420B with respect to the microfluidic device (i.e., above reservoir 30) in this embodiment is not actually shown.

As similarly described above in connection with FIGS. 2A-2C, the selective application of positive voltage to steering electrodes 410A, 410B, 420A, and 420B in FIGS. 7A-7E causes the interface surface to take on a particular tilt. However, according to an exemplary embodiment in relation to FIGS. 7A-7E, the positive voltage may be selectively applied to multiple electrodes to displace the interface surface to a different position.

Figure 7A:
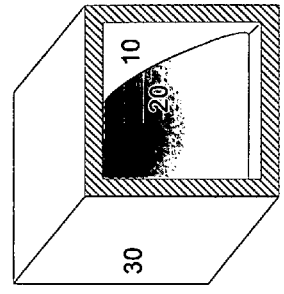
FIGS. 7A-7E illustrate different positions, respectively, of the interface surface in a microfluidic device capable of two-dimensional tilting, in accordance with the applied electrokinetic force, according to an exemplary embodiment of the present invention.

As shown in FIG. 7A, the application of positive voltage to all of the steering electrode 410A, 410B, 420A, and 420B causes a uniform electric field above fluids 10 and 20, thereby causing little or no tilt. However, as illustrated in FIGS. 7B-7E, the application of voltage to any adjacent pair of steering electrodes causes the electrically conductive electrodes to be attracted to those electrodes.

Figure 7B:
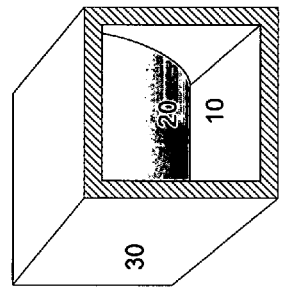
Figure 7C:
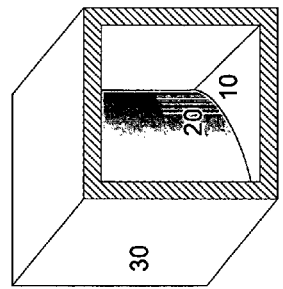
Figure 7D:
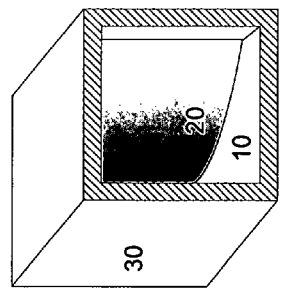
Figure 7E:
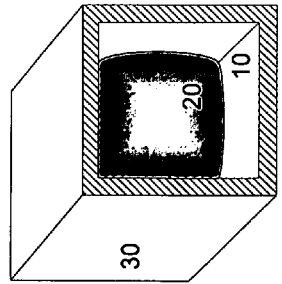

For example, in FIG. 7B, selectively applying a positive voltage to steering electrodes 410A and 410B causes the electrically conductive fluid 10 to be attracted to those electrodes, thus causing the interface surface to tilt toward electrodes 410A and 410B. Similarly, in FIG. 7C, the selective application of positive voltage to electrodes 420A and 420B causes the electrically conductive fluid 10 to be attracted to those electrodes, thus causing the interface surface to tilt toward electrodes 420A and 420B. The same effect is shown in FIG. 7D, in which the positive voltage is selectively applied to electrodes 410B and 420B; and in FIG. 7E, in which the positive voltage is selectively applied to electrodes 410A and 420A.

Although four steering electrodes are shown in the embodiment of FIG. 6 and FIGS. 7A-7E, it should be noted that the number of steering electrodes could be increased further in order to provide tighter control of the shape and position of the interface surface. For example, increasing the number of steering electrodes may increase precision and allow for additional operative positions for the interface surface.

As described above, exemplary embodiments of the present invention contemplate a projection image display system in which a microfluidic device 1, 1' redirects light (by reflection or refraction) to an external absorptive surface 60 while in the OFF state. However, in an alternative exemplary embodiment, a microfluidic device may be configured such that an internal absorptive surface is implemented in the walls of the reservoir 30. According to this embodiment, the microfluidic device may be configured to utilize total internal reflection to redirect the incoming light to the absorptive surface while in the OFF state.

Figure 8:
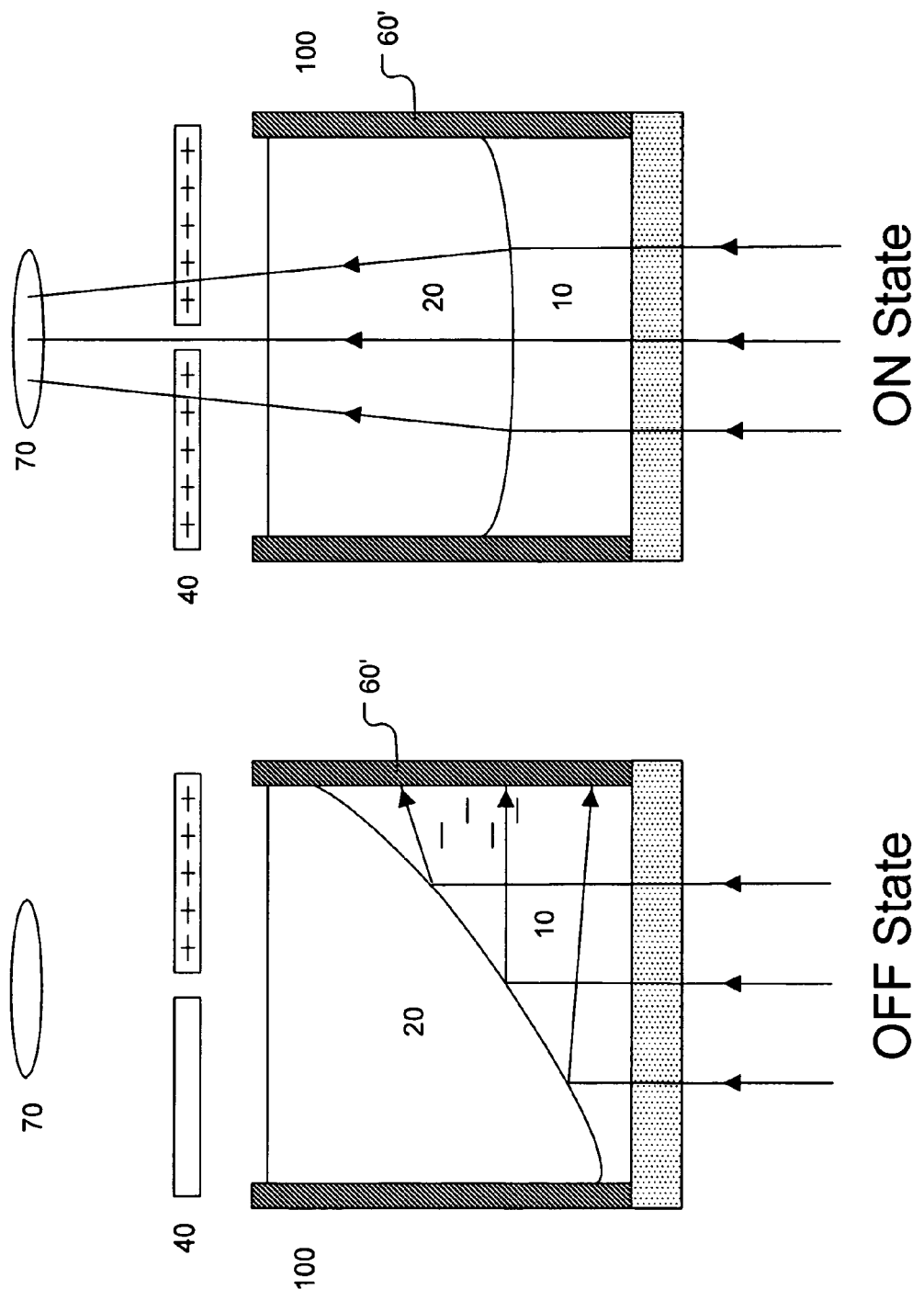
FIG. 8 illustrates a microfluidic device utilizing total internal reflection, according to an exemplary embodiment of the present invention.

FIG. 8 illustrates a microfluidic device 100 utilizing total internal reflection, according to an exemplary embodiment. As shown in FIG. 8, while in the OFF state, the driving unit 40 may be configured to drive the interface surface to a particular tilt angle, thereby causing the incoming light to be redirected toward the absorptive surface 60' incorporated in the inner wall of the reservoir 30. Since fluid 10 is displaced toward the wall incorporating the absorptive surface 60', the fluid 10 may be operable to cool the absorptive surface 60' as it absorbs the incoming light.

According to FIG. 8, while the microfluidic device 100 is in the ON state, it may not be necessary for the driving unit 40 to cause the interface surface to tilt. E.g., as shown in FIG. 8, the optical system 70 and display surface 80 (not shown) may be configured to receive light transmitting through the microfluidic device 100 while the interface surface is at a non-tilting position.

An imaging system incorporating a microfluidic device 100 that uses total internal reflection may have the advantage of a more compact design. This may be accomplished since there is no need for an external absorptive surface, and a more straightforward path from each microfluidic device 100 to the display surface 80.

Exemplary embodiments of the present invention are directed toward a projection-type imaging system in which multiple microfluidic devices are arranged as an imaging array. In such an embodiment, each microfluidic device may be configured as a pixel element in the imaging system. Furthermore, the operation of the electrical drive unit 40 for each microfluidic device is compatible with thin-film transistor (TFT) processes that are used in the manufacture of, e.g., liquid crystal display (LCD) panels.

Figure 9:
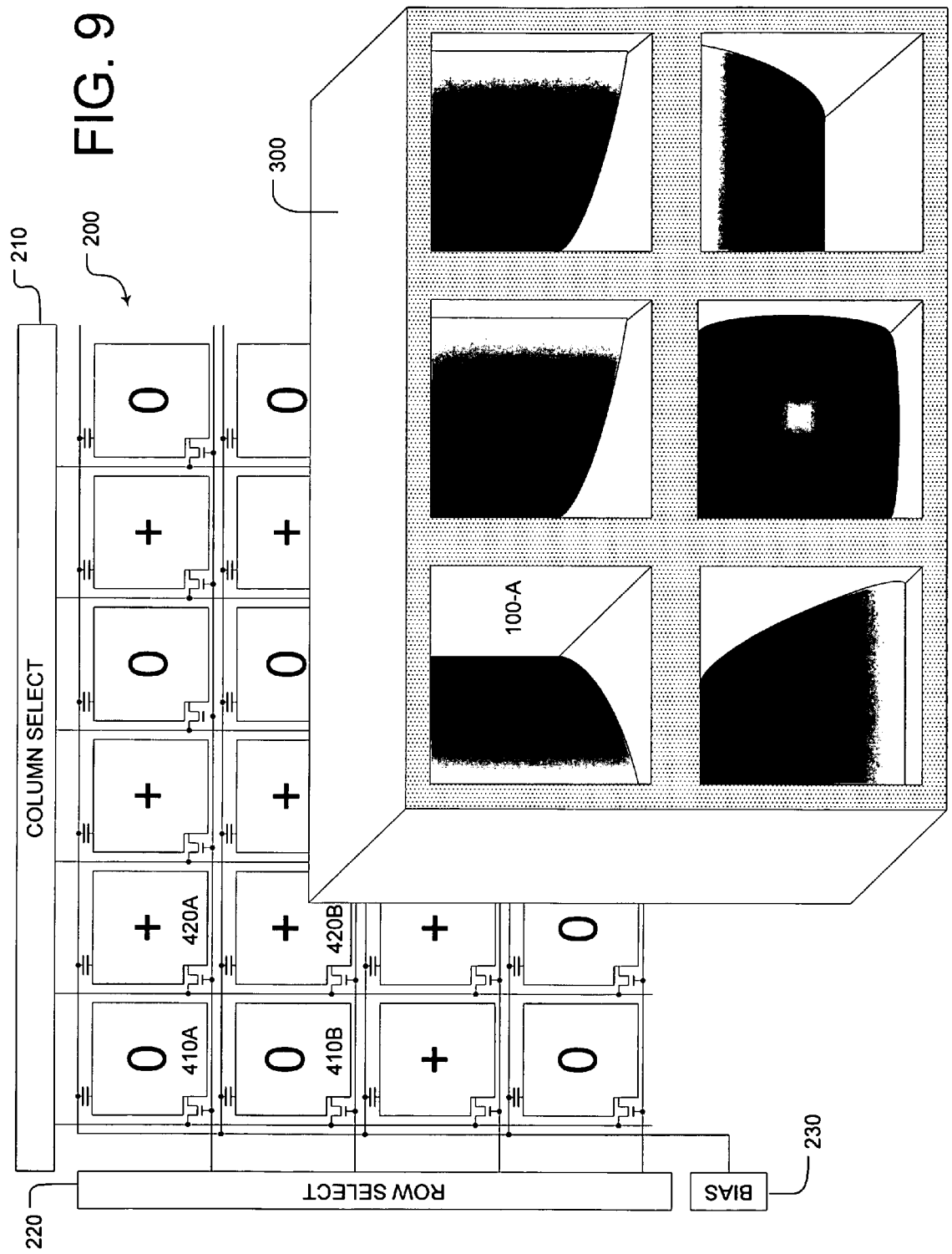
FIG. 9 illustrates a plurality of microfluidic devices arranged as an imaging array driven by a thin-film transistor (TFT) circuit, according to an exemplary embodiment of the present invention.

Thus, according to an exemplary embodiment, the electrical drive units 40 for an imaging array of microfluidic devices may be implemented using a TFT circuit. FIG. 9 illustrates a TFT circuit 200 configured to drive an imaging array 300 of microfluidic devices, according to an exemplary embodiment.

For purposes of illustration, the microfluidic devices in array 300 of FIG. 9 are consistent with the embodiment described above in connection with FIG. 6, i.e., using two-dimensional tilting of the interface surface. However, it should be noted that in alternative embodiments, a TFT circuit may be configured to drive an array of microfluidic devices 1 or 1', which are described above in connection with FIGS. 1A and 1B, respectively.

Referring to FIG. 9, the shaded steering electrodes 410A, 410B, 420A, and 420B are part of the driving unit 40 for the particular microfluidic device 100-A in imaging array 300. Similarly, each of the other microfluidic devices in the array 300 have a corresponding set of steering electrodes 410A, 410B, 420A, and 420B in the TFT circuit 200.

In FIG. 9, the COLUMN SELECT and ROW SELECT units 210 and 220, respectively of the TFT circuit 200 may be configured to respond to control signals from a display controller (not shown). Based on such control signals, for each microfluidic device, the COLUMN SELECT and ROW SELECT units 210 and 220 are configured to control a transistor coupled to each steering electrode 410A, 410B, 420A, and 420B to charge the corresponding capacitance to a certain voltage level, where is remains until the next refresh cycle. As such, each transistors can be assigned an x-y address in the TFT circuit, so that the COLUMN SELECT and ROW SELECT units 210 and 220 to drive each steering electrode separately.

Exemplary embodiments having been described above, it should be noted that such descriptions are provided for illustration only and, thus, are not meant to limit the present invention as defined by the claims below. Any variations or modifications of these embodiments, which do not depart from the spirit and scope of the present invention, are intended to be included within the scope of the claimed invention.

What is claimed is:

1. A microfluidic device comprising:
    a reservoir containing first and second fluids of different electric or magnetic properties, wherein the first and second fluids are immiscible such that an interface surface is formed between the first and second fluids; and
    a drive unit including at least two steering electrodes and operable to selectively displace the interface surface into at least two different positions via an electric or magnetic force,
    wherein:
        a voltage selectively applied to each steering electrode generates an electric force between that steering electrode and the first fluid,
        the selective application of the voltage to the at least two steering electrodes determines a tilt angle of the interface surface with respect to a tilt axis,
        each of the at least two different positions correspond to different tilt angles of the interface surface with respect to the tilt axis, and
        the first and second fluids have different optical properties, such that
            while in a first position, the interface surface is configured so that light transmitted by a source is directed to a display surface, and while in a second position, the interface surface is configured to redirect the transmitted light away from the display surface.

2. The microfluidic device of claim 1, wherein one of the fluids is reflective and the other is optically clear.

3. The microfluidic device of claim 1, wherein,
while in the first position, the interface surface is configured to reflect the transmitted light in such a manner that the reflected light is directed to the display surface, and
while in the second position, the interface surface is configured to reflect the transmitted light away from the display surface.

4. The microfluidic device of claim 1, wherein the first and second fluids have different refraction indices.

5. The microfluidic device of claim 4, wherein
while in the first position, the interface surface is configured to refract the transmitted light to the absorptive surface, and
while in the second position, the interface surface is configured to refract the transmitted light in such a manner that the deflected light is directed to the display surface.

6. The microfluidic device of claim 1, wherein
an absorptive surface is implemented as part of the reservoir's inner surface, and
while in the first position, the interface surface causes the transmitted light to be diverted to the absorptive surface by total internal reflection.

7. The microfluidic device of claim 1, wherein the first fluid has a higher electrical conductivity than the second fluid.

8. The microfluidic device of claim 7, wherein the second fluid is in gaseous form.

9. The microfluidic device of claim 1, wherein
the drive unit comprises more than two steering electrodes above the reservoir, the drive unit further being configured to selectively displace the interface surface into multiple positions.

10. The microfluidic device of claim 1, wherein the drive unit is adapted to selectively displace the interface into the at least two different positions through electrophoresis or dielectrophoresis.

11. The microfluidic device of claim 1, wherein the drive unit further comprises an electrode connected to the first fluid, thereby grounding the first fluid or setting the first fluid to a particular potential.

12. The microfluidic device of claim 1, wherein the electrodes are implemented in opposing side walls of the reservoir, the interface surface being displaced according to electrowetting.

13. The image display device of claim 1, wherein
two steering electrodes are implemented above the reservoir,
a third steering electrode is implemented in the bottom wall of the reservoir, and
the interface surface being displaced according to dielectrophoresis.

14. The microfluidic device of claim 1, wherein the drive unit comprises:
first and second electrodes at opposing sides of the reservoir, the first and second electrodes being electrically isolated from the first and second fluids, a potential difference being maintained between the first and second electrodes; and
a third electrode configured to selectively apply a voltage to the first fluid, thereby generating an electrostatic force attracting the first fluid to the first or second electrode.

15. The microfluidic device of claim 14, wherein, in order for the third electrode to selectively apply the voltage to the first fluid, one of the following is satisfied:
the third electrode makes direct electrical contact with the first fluid, or
the third electrode is capacitively coupled to the first fluid.

16. An image display device including a plurality of the microfluidic devices in claim 1, each of the microfluidic devices corresponding to a pixel of an image to be displayed by the image display device.

17. The image display device of 16, further comprising a thin-film transistor (TFT) circuit,
wherein the TFT circuit includes the drive unit for each of the plurality of microfluidic devices.

18. A microfluidic device comprising:
a reservoir containing first and second fluids of different electric or magnetic properties, wherein the first and second fluids are immiscible such that an interface surface is formed between the first and second fluids; and
a drive unit including at least two steering electrodes implemented in opposing side walls of the reservoir, the drive unit operable to selectively displace the interface surface according to electrowetting into first and second positions via an electric or magnetic force,
wherein:
a voltage selectively applied to each steering electrode generates an electric force between that steering electrode and the first fluid, and
the first and second fluids have different optical properties, such that
while in the first position, the interface surface is configured so that light transmitted by a source is directed to a display surface, and
while in the second position, the interface surface is configured to redirect the transmitted light away from the display surface. the interface surface being displaced.

19. A microfluidic device comprising:
a reservoir containing first and second fluids of different electric or magnetic properties, wherein the first and second fluids are immiscible such that an interface surface is formed between the first and second fluids; and
a drive unit including at least two steering electrodes implemented above the reservoir and a third steering electrode implemented in a bottom wall of the reservoir, the drive unit operable to selectively displace the interface surface according to dielectrophoresis into first and second positions via an electric or magnetic force,
wherein:
a voltage selectively applied to each steering electrode generates an electric force between that steering electrode and the first fluid, and
the first and second fluids have different optical properties, such that
while in the first position, the interface surface is configured so that light transmitted by a source is directed to a display surface, and
while in the second position, the interface surface is configured to redirect the transmitted light away from the display surface.

* * * * *